Nov. 28, 1961  J. HERMANN ET AL  3,011,124
LIGHT-BEAM DEFLECTOR
Filed April 13, 1959  5 Sheets-Sheet 4

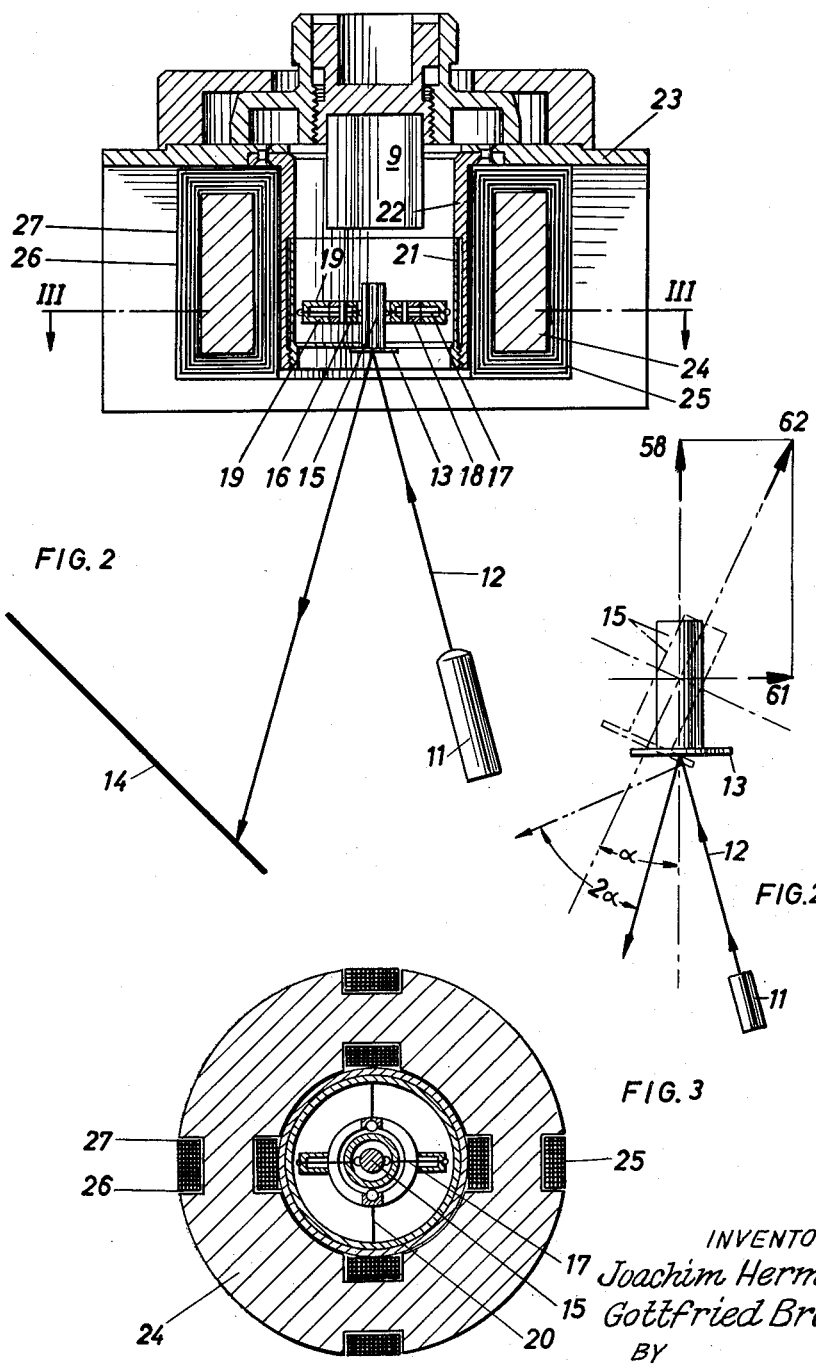

INVENTORS
Joachim Hermann
Gottfried Bronner
By Stevens, Davis, Miller & Mosher
Their Attorneys Nov. 28, 1961   J. HERMANN ET AL   3,011,124
LIGHT-BEAM DEFLECTOR
Filed April 13, 1959   5 Sheets-Sheet 5

INVENTORS
Joachim Hermann
Gottfried Bronner
By Stevens, Davis, Miller & Mosher
THEIR ATTORNEYS United States Patent Office 3,011,124
Patented Nov. 28, 1961

3,011,124
LIGHT-BEAM DEFLECTOR
Joachim Hermann, Munich, and Gottfried Bronner, Tubingen-Lustenau, Germany, assignors to Ludwig Bolkow, Ottobrunn, Germany
Filed Apr. 13, 1959, Ser. No. 806,076
Claims priority, application Germany Apr. 15, 1958
9 Claims. (Cl. 324—97)

For the optical demonstration of functions obtained in the form of electric voltages or currents, in the measuring art, it is a common practice these days to use the moving spot of light from a cathode-ray oscillograph. Limits on obtaining a large-scale representation are imposed by the given sizes of the screens in the cathode-ray tubes. An optical enlargement of the screen image is possible but is associated with a loss of brightness which, apart from the necessary optical expenditure, limits the size of the image field which can be displayed. For some applications, such as the demonstration of data curves or function curves in electronic analogue computers before a large audience, and particularly for the representation of aircraft which are remote-controlled from airfields, it is desirable to have the largest possible image field which can be displayed.

Devices are known for the large-scale projection of a spot of light which can be controlled in two dimensions wherein a punctiform light source can be displaced in two co-ordinates by means of servo-motors. The punctiform light source is in the object plane of a projection device. In this known device the frequency band which can be represented is greatly restricted as a result of the inertia of the driving motors. The technical expenditure and the cost of the device are considerable. Devices are also known wherein a light source, together with an optical system for producing a projection focus, is adapted for pivoting about two axes. Here, too, however, the pivoting members have high moments of inertia which renders the representation of rapidly oscillating functions impossible.

It is the object of the invention to achieve the projection of functions on a large scale with the minimum expenditure and without having a negative effect on the quality of the optical representation, even of functions which are oscillating comparatively rapidly.

The present invention lies in the use of an optical element, preferably a concave mirror of small dimensions or a suitably constructed lens or set of lenses, to reproduce a punctiform light source on a screen or the like, the element being mounted in gimbals and the pivotal movement of the element being controlled electromagnetically. In the specific embodiment of the invention the element is on a magnetic dipole which is mounted in gimbals.

The projected punctiform image of the light source is displaced according to the angle which the mirror axis forms with the direction of the light source, a pivoting movement of the mirror through an angle $\alpha$ leading to an angular displacement of the projected image through an angle $2\alpha$. If a planoconvex lens, for example, is pivoted about the centre of curvatures, the law of refraction applies, according to which a pivoting of the lens through an angle $\alpha_1$ leads to a pivoting movement of the projected image through an angle $(\alpha_1-\alpha_2)$, where $\alpha_1$ and $\alpha_2$ are related by the equation $$\frac{\sin \alpha_1}{\sin \alpha_2}=n$$

$n$ being the index of refraction of the glass of the lens.

In order to obtain the same beam deflection, a considerably smaller pivotal angle of the dipole is necessary in the embodiment with a mirror than in the embodiment with a lens. Accordingly, more-rapidly oscillating functions can be represented with the same moving masses when using a mirror than when using a lens or a set of lenses.

On the other hand, the construction with lenses is more satisfactory for a very accurate representation. The deflection of the beam with a mirror has the disadvantage that it is impossible to reflect back in the direction of the light source. The light source therefore has to be set up at an angle to the projection screen which leads to a different scale factor in the direction of the deflected light source in comparison with the direction perpendicular thereto. The construction with lenses does not have this drawback.

The deflecting mirror or the lens system is rigidly connected to a magnetic dipole. The gimbals suspension of the magnetic mirror system is effected by means of torsion wires in order to prevent harmful friction. The wires are so dimensioned that the natural torsion frequencies of the system are as low as possible. The restoration of the moving masses may be effected by the torsion wires or the dipole may be mounted substantially free of turning moments.

The control of the magnetic system is effected by means of a combination of three homogeneous magnetic fields, the vectors of which are perpendicular to one another at the locus of the dipole and in its immediate vicinity.

With a turning-moment-free mounting, the magnetic dipole assumes the direction of the resultant of the three external fields. One of the three fields is constant and defines the zero position of the dipole. Hereinafter it is referred to as the directional field. The other two are called control fields.

Restoration by means of the directional field has the advantage over restoration by means of torsion wires that the sensitivity of the deflecting system can be varied.

Such an adjustable directional field is preferably produced electromagnetically, while a constant directional field is preferably produced by means of a permanent magnet. On the other hand, the control fields have to be produced electromagnetically, although here, too, permanent magnetic fields may be added.

The electromagnetic production of each of the two control fields by means of control currents is preferably effected through a push-pull amplifier with a low internal resistance, with two symmetrically shaped halves of a control winding in its two anode branches. In addition, this offers further advantages.

(1) Induced voltage peaks, which could assume dangerous values in the control windings with rapid control variations, are reduced.

(2) Because of the low internal resistance of the controlling amplifier, the induced voltage, which is substantially proportional to the speed of rotation of the dipole, leads to an appreciable damping of the mechanical dipole movement. Further damping is generally superfluous.

When a damping means is used wherein the dipole mirror system is immersed in liquid, it is possible, by selection of a liquid having a high power of refraction, to obtain a gain in optical deflection. With the system using lenses, the high power of refraction of the damping liquid may be used in such a manner that the planoconcave lens consists of a material having a lower power of refraction. For example, it may be constructed in the form of an air-lens with thin glass walls.

Details of the subject of the invention are illustrated by way of example in the drawings in which:

FIG. 2 is a view in horizontal section of the deflecting device shown in FIG. 1;

FIG. 2a is a diagrammatic view showing the movement of the dipole and the associated variation in the beam deflection;

FIG. 3 is a view in vertical section of the deflecting device shown in FIG. 1;

Figure 1:
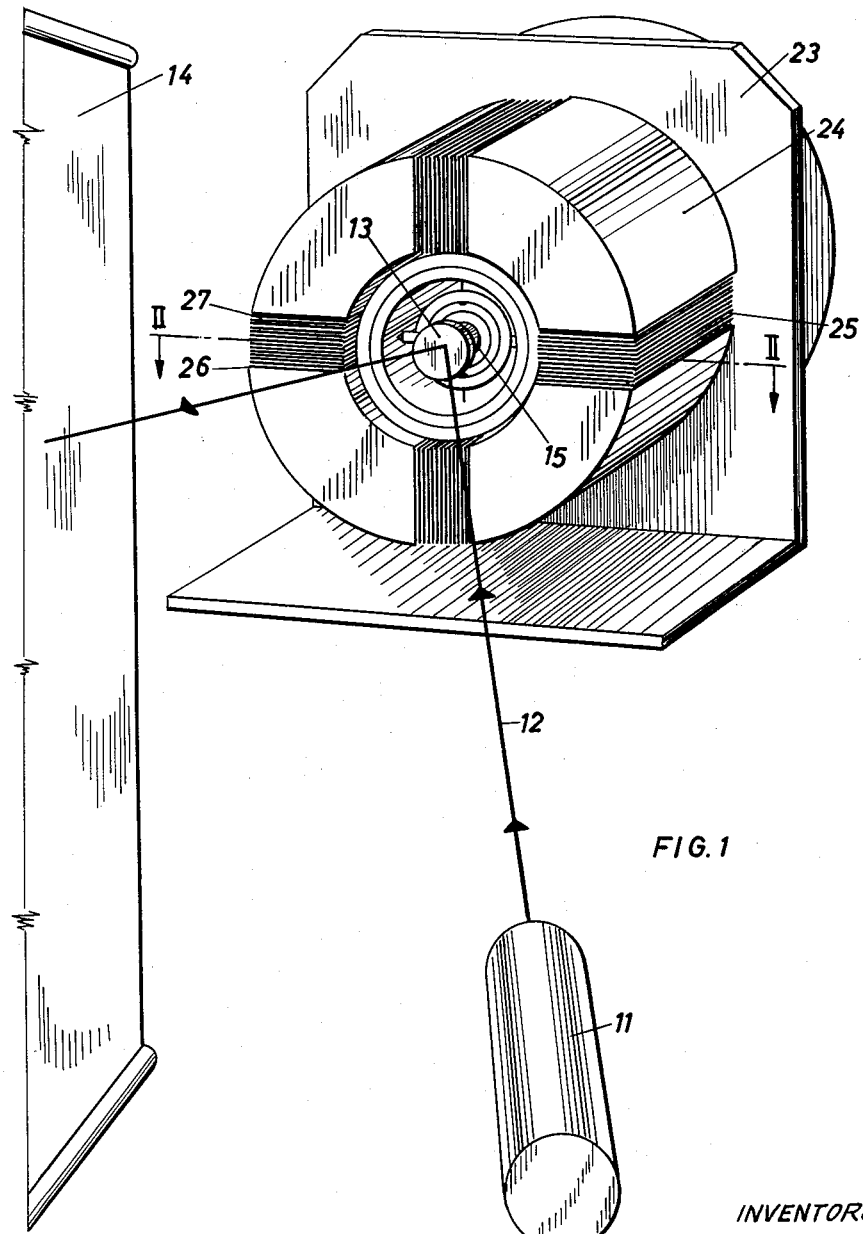
FIG. 1 is an isometric view of the complete beam deflecting system.

FIGS. 1, 2 and 2a show how a beam of light 12 is thrown from a light source 11 onto a mirror 13, reflected from the mirror and projected onto a screen 14.

The mirror 13 is secured to a bar magnet 15. The bar magnet 15 is centrally suspended in a holding ring 16 by thin, relatively long tension wires 17 which are held at their outer ends in mounting members 19 secured to a gimbals ring 18. The passages through the members 19, the holding ring 16 and the gimbal ring 18 are so spaced that the tension wires 17 intermediate their ends do not touch any component. The gimbal ring 18 is mounted in turn by means of tension wires 20 to rotate in the housing about an axis which is offset by 90° in relation to the wires 17.

Figure 9:
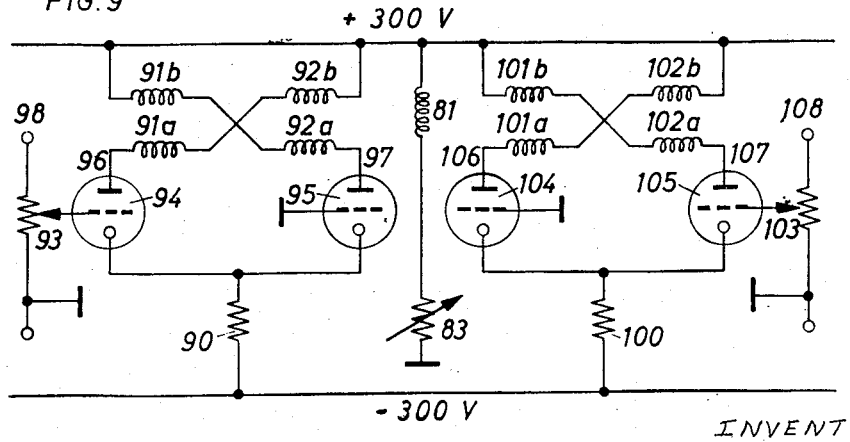
FIG. 9 is a circuit diagram for the electrical circuit of the coils producing the control and directional fields.

The housing consists of a tubular member 21 which is screwed into another tube 22. This tube is screwed onto a rear plate 23 of the deflector device and serves as a core for an annular magnet 24, of ferro-magnetic material, provided with coils 25. These coils 25 are connected by means of their connections 26, 27, to a cathode-coupled push-pull amplifier system as shown in FIG. 9.

The lateral movement resulting from this mounting, on pivoting the mirror 13, is small in comparison to the projection distance. It amounts to about $1/1000$ thereof and can therefore be ignored. It is also possible to arrange a concave mirror substantially near the middle of the magnet, with the magnet passing through an aperture in the centre of the concave mirror, whereby said lateral movement can be compensated entirely.

Figure 4:
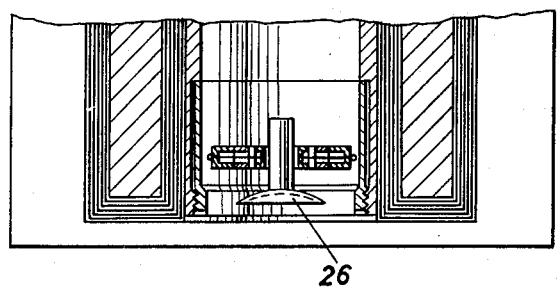
FIG. 4 is a view in section showing a dipole concave mirror reflector suspended on gimbals between the magnetic coils of a deflector device.

The mirror 13 on the bar magnet 15 may be a plane mirror or a concave mirror 26 as shown in FIG. 4.

Figure 5:
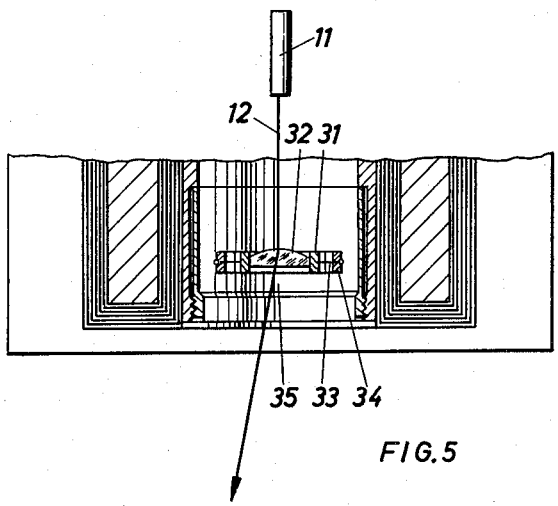
FIG. 5 is a view in section showing a collector lens (convex lens) arranged in a dipole suspended similarly to that of FIG. 4.

It is also possible to use a glass lens instead of the mirror. In this case, the light source 11 is arranged behind the lens. The beam of light 12 passes through the lens and is deflected in various directions according to the position of the lens. In FIG. 5, a planoconvex lens 32 is accommodated in the aperture in an annular magnet 31. This magnet is polarized in the direction of the annular axis and suspended by means of torsion wires 33 in a ring 34 which is mounted in the housing in the same manner as the ring 18 shown in FIGS. 1 to 3. The lateral displacement of the deflecting member described in this example is nil if, in contrast to the embodiment illustrated in FIG. 5, the centre of curvature 35 of the convex lens surface lies at the pivotal point of the system.

The convex lens 32 described here may be an objective consisting of a plurality of individual lenses which do not necessarily have to be rigidly connected together.

Figure 6:
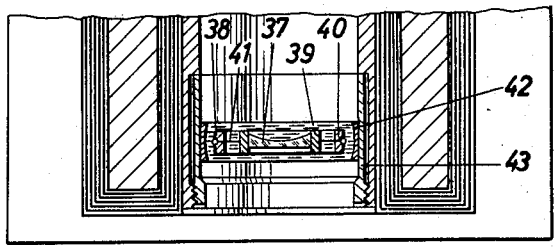
FIG. 6 is a view in section showing a concave lens similarly arranged and immersed in liquid.

FIG. 6 shows an arrangement wherein the glass lens 37 is constructed in the form of a planoconcave lens and lies in a liquid 38. Like the convex lens in the previous example, it is suspended in an annular magnet 39 which is fully suspended in gimbals by means of a gimbal ring 40 and tension wires 41 in the transparent liquid container 42. The liquid container 42 is fixedly mounted in the tubular housing 43.

Figure 7:
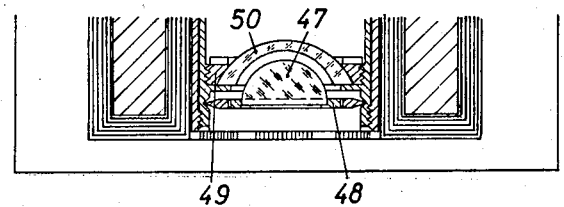
FIG. 7 is a view in section showing the combination of a fixedly-mounted concave lens and a collector lens suspended on gimbals.

In FIG. 7, a portion 47 of the objective, which is constructed in the form of a convex lens or set of lenses with a short focal length, is connected to the magnetic annular dipole 48. This dipole 48 is suspended in gimbals in the housing 49. A concave lens 50 which is rigidly built into the housing 49 is provided in front of this system. The effect of the whole lens system is that of an objective having a long focal length.

Figure 11:
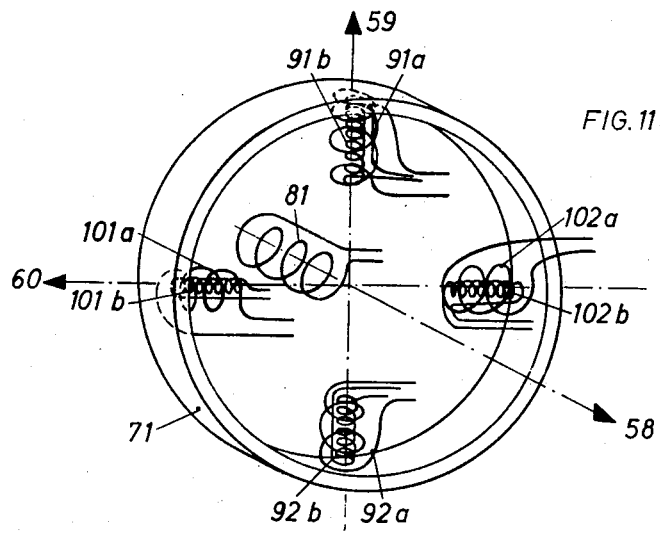
FIG. 11 is a diagrammatic view showing the basic arrangement of the coils shown in FIG. 8.
Figure 10:
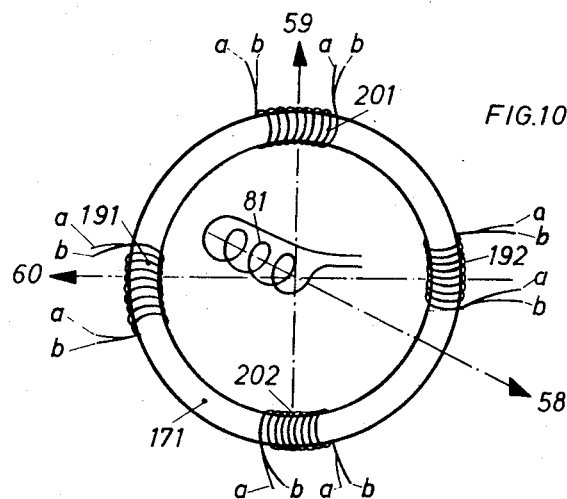
FIG. 10 is a diagrammatic view showing the basic arrangement of the coils shown in FIGS. 1 and 3.

The magnetic dipole 15 or 31 is controlled by the magnetic fields 58 and 61 represented as vectors in FIG. 2a. The field 61 is the resultant of the two control fields 59 and 60 which are illustrated in FIGS. 10 and 11 and which lie in a plane containing the annular magnet 71 or 171. The two fields 58 and 61 produce a resultant field 62 and since the dipole is suspended substantially free of turning moments, it always assumes the direction of the resultant 62. In the position of rest, i.e. when there are no fields 59 and 60, this coincides with the vector 58 of the steady directional field produced by a magnet 9, as in FIG. 2, which magnet may be a permanent magnet or an electromagnet. When there is a field 59 and/or 60, the dipole is deflected from its rest position through an angle $\alpha$ under the action of the resultant field 62. The beam of light 63 falling on the mirror 13, which is normally reflected in the direction 64, is reflected in the direction 65, i.e. it is reflected further through an angle $2\alpha$ in relation to the direction 64.

The production of the variable magnetic fields is effected by the coils 25 in FIGS. 1 to 3, the mode of operation of which is explained with reference to FIG. 10. The directional field 58 is produced by an electromagnet comprising a coil 81, and the control fields 59 and 60 by the double-wound coils 191 and 192, 201 and 202. Equidirectional magnetic fields are developed in the coils 191 and 192 and give rise, in the centre of the ring, to a substantially homogeneous oppositely directed magnetic field 59. The individual wires $a$ and $b$ of the double-wound coils 191 and 192 have current flowing through them in the opposite direction so that two oppositely directed magnetic fields are developed. If the two fields are equal in magnitude, the resulting field strength is equal to zero. If one field is greater, then the resulting field is directed accordingly, and if the other field is greater, the resulting field direction is reversed. A homogeneous, variable magnetic field, which is perpendicular to the first, is produced in the centre of the ring in the same manner by the coils 201 and 202. The dipole is suspended at the point of intersection of the magnetic field vectors and points in the direction 58 in the position of rest.

Figure 8:
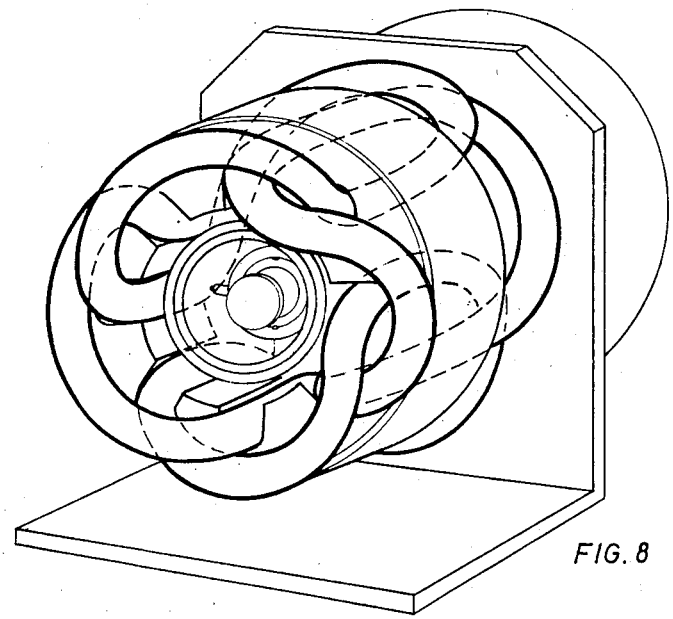
FIG. 8 is an isometric view showing an arrangement of the windings for the magnetic fields wherein the ends of the windings face inwardly.

Another coil arrangement is illustrated in FIG. 11. Here the steady directional field is produced by a coil 81 and the variable control fields 59 and 60 by the coils 91 and 92, and 101 and 102 suitably arranged on a ring 71, preferably of ferro-magnetic material. These control-field coils each have two windings $a$ and $b$ one above the other, through which current flows in the opposite direction. In this manner, the resulting field of the two windings in one coil may be greater than, equal to or less than zero. An example of this coil arrangement is shown in FIG. 8.

The coils of the control fields are connected to triodes with which they form a cathode-coupled push-pull amplifier system as shown in FIG. 9. The individual windings $a$ and $b$ of the coils 91, 92, 101 and 102 are connected, oppositely, as shown, to the amplifier outputs 96, 97, 106 and 107 of the triodes 94, 95, 104 and 105 and to a +300 v. bus bar. The cathodes of the valves 94 and 95, and 104 and 105, are each connected through a common cathode resistor 90 and 100 to a −300 v. bus bar. The scale adjustment of the two control inputs 98 and 108 can be varied by means of the potentiometers 93 and 103. The current through the directional-field coil 81 can be varied by the variable resistor 83 thus varying the sensitivity of the whole system.

What we claim is:

1. In a device for the two-dimensional representation of phenomena or functions by the projection on to a screen of a spot of light movable in two co-ordinate directions, the combination of a magnetic member, an optical element on said magnetic member and movable therewith, an annular magnetic member, gimbal suspension means supporting said magnetic member within said annular magnetic member with their axes coincident, said gimbal suspension means comprising a ring and radially-extending tension wires extending between the ring and the annular magnetic member, said tension wires supporting said ring within said annular magnetic member, and further radially-extending tension wires extending between the magnetic member and the ring and lying in a radial plane transverse to the radial plane containing the first-mentioned tension wires, said further tension wires supporting said magnetic member within said ring, two pairs of windings on said annular magnetic member, each pair being doubly wound in the sense to produce magnetic fields of opposite polarity in the two windings of each of said pairs, the windings of each of said pairs being positioned diametrally of said annular magnetic member and lying in the radial plane containing one each of said tension wires, said windings being effective to produce within said annular magnetic member two transverse variable magnetic fields upon the passage through said windings of signal currents corresponding to the phenomena or functions to be represented, and means for producing a steady magnetic field along the axis of said annular magnetic member operative to return said magnetic member to a zero position in the absence of signal current.

2. In a device for the two-dimensional representation of phenomena or functions by the projection on to a screen of a spot of light movable in two coordinate directions, the combination of a bar magnet provided at one end with a light-reflective surface movable therewith, an annular magnetic member, gimbal suspension means supporting said bar magnet within said annular magnet with their axes coincident, said gimbal suspension means comprising a ring and radially-extending tension wires extending between the ring and the annular magnetic member, said tension wires supporting said ring within said annular magnet, and further radially-extending tension wires extending between the bar magnet and the ring and lying in a radial plane transverse to the radial plane containing the first-mentioned tension wires, said further tension wires supporting said bar magnet within said ring, two pairs of windings on said annular magnetic member, each pair being doubly wound in the sense to produce magnetic fields of opposite polarity in the two windings of each of said pairs, the windings of each of said pairs being postioned diametrally of said annular magnetic member and lying in the radial plane containing one each of said tension wires, said windings being effective to produce within said annular magnetic member two transverse variable magnetic fields upon the passage through said windings of signal currents corresponding to the phenomena or functions to be represented, and means for producing a steady magnetic field along the axis of said annular magnetic member operative to return said bar magnet to a zero position in the absence of signal current.

3. In a device for the two-dimensional representation of phenomena or functions by the production on to a screen of a spot of light movable in two co-ordinate directions, the combination of a ring magnet and an optical lens systems mounted within said ring magnet and movable therewith, an annular magnetic member, gimbal suspension means supporting said ring magnet within said annular magnet with their axes coincident, said gimbal suspension means comprising a ring and radically-extending tension wires extending between the ring and the annular magnetic member, said tension wires supporting said ring within said annular magntic member, and further radially-extending tension wires extending between the ring magnet and the ring and lying in a radial plane transverse to the radial plane containing the first-mentioned tension wires, said further tension wires supporting said ring magnetic within said ring, two pairs of windings on said annular magnetic member, each pair being doubly wound in the sense to produce magnetic fields of opposite polarity in the two windings of each of said pairs, the windings of each of said pairs being positioned diametrally of said annular magnetic member and lying in the radial plane containing one each of said tension wires, said windings being effective to produce in said annular magnetic member two transverse variable magnetic fields upon the passage through said windings of signal currents corresponding to the phenomena or functions to be represented, and means for producing a steady magnetic field along the axis of said annular magnetic member operative to return said ring magnet to a zero position in the absence of signal currents.

4. In a device for the two-dimensional representation of phenomena or functions by the production on to a screen of a spot of light movable in two co-ordinate directions, the combination of a ring magnet and an optical lens systems mounted within said ring magnet and movable therewith, an annular magnetic member, gimbal suspension means supporting said ring magnet within said annular magnet with their axes coincident, said gimbal suspension means comprising a ring and radically-extending tension wires extending between the ring and the annular magnetic member, said tension wires supporting said ring within said annular magntic member, and further radially-extending tension wires extending between the ring magnet and the ring and lying in a radial plane transverse to the radial plane containing the first-mentioned tension wires, said further tension wires supporting said ring magnetic within said ring, two pairs of windings on said annular magnetic member, each pair being doubly wound in the sense to produce magnetic fields of opposite polarity in the two windings of each of said pairs, the windings of each of said pairs being positioned diametrally of said annular magnetic member and lying in the radial plane containing one each of said tension wires, said windings being effective to produce in said annular magnetic member two transverse variable magnetic fields upon the passage through said windings of signal currents corresponding to the phenomena or functions to be represented, and means for producing a steady magnetic field along the axis of said annular magnetic member operative to return said ring magnet to a zero position in the absence of signal currents, and means to immerse at least said ring magnet and optical lens system in liquid.

5. In a device as claimed in claim 4, said optical lens system forming a planoconcaive lens of material having a low refractive index, and said liquid being of high refractive index.

6. In a device for the two-dimensional representation of phenomena or functions by the projection on to a screen of a spot of light movable in two co-ordinate directions, the combination of a ring magnet, an optical lens mounted within said ring magnet and movable therewith, an annular magnetic member, gimbal suspension means supporting said ring magnet within said annular magnetic member with their axes coincident, said gimbal suspension means comprising a ring and radially-extending tension wires extending between the ring and the annular magnetic member, said tension wires supporting said ring within said annular magnetic member, and further radially-extending tension wires extending between the ring magnet and the ring and lying in a radial plane transverse to the radial plane containing the first-mentioned tension wires, said further tension wires supporting said ring magnet within said ring, a lens fixedly-mounted within said annular magnetic member and positioned to cooperate with said movable lens, two pairs of windings on said annular magnetic member, each pair being doubly wound in the sense to produce magnetic fields of opposite polarity in the two windings of each of said pairs, the windings of each of said pairs being positioned diametrally of said annular magnetic member and lying in the radial plane containing one each of said tension wires, said windings being effective to produce within said annular magnetic member two transverse variable magnetic fields upon the passage through said windings of signal currents corresponding to the phenomena or functions to be represented, and means for producing a steady field along the axis of said annular magnetic member operative to return said ring magnet to a zero position in the absence of signal currents.

7. In a device as claimed in claim 6, said movable lens being an objective lens having a short focal length, and said fixedly-mounted lens being a concave lens.

8. In a device for the two-dimensional representation of phenomena or functions by the projection on to a screen of a spot of light movable in two co-ordinate directions, the combination of a magnetic member, an optical element on said magnetic member and movable therewith, an annular magnetic member, gimbal suspension means supporting said magnetic member within said annular magnetic member with their axes coincident, said gimbal suspension means comprising a ring and radially-extending tension wires extending between the ring and the annular magnetic member, said tension wires supporting said ring within said annular magnetic member, and further radially-extending tension wires extending between the magnetic member and the ring and lying in a radial plane transverse to the radial plane containing the first-mentioned tension wires, said further tension wires supporting said magnetic member within said ring, two pairs of windings on said annular magnetic member, each pair being doubly wound in the sense to produce magnetic fields of opposite polarity in the two windings of each of said pairs, the windings of each of said pairs being positioned diametrally of said annular magnetic member and lying in the radial plane containing one each of said tension wires, said windings being effective to produce within said annular magnetic member two transverse variable magnetic fields upon the passage through said windings of signal currents corresponding to the phenomena or functions to be represented, means for producing a steady magnetic field along the axis of said annular magnetic member operative to return said magnetic member to a zero position in the absence of signal current, a push-pull amplifier circuit including at least two thermionic valves, each of said valves including an anode and a cathode, a winding of one of said coils being connected in series with a winding of the other of said coils to the anode of one of said valves and the other windings of said coils being connected in series with the anode of the other of said valves.

9. In the device as claimed in claim 8, at least one of said valves being a triode valve.

References Cited in the file of this patent
UNITED STATES PATENTS

| | | |
|---|---|---|
| 1,873,696 | Centeno | Aug. 23, 1932 |
| 2,034,583 | Koch | Mar. 17, 1936 |
| 2,059,159 | Whitaker | Oct. 27, 1936 |